United States Patent [19]

Camp

[11] Patent Number: 4,716,922
[45] Date of Patent: Jan. 5, 1988

[54] MAGNETIC FIRE HYDRANT GUARD

[76] Inventor: John P. Camp, 8717 Hopewell Dr., El Paso, Tex. 79925

[21] Appl. No.: 58,514

[22] Filed: Jun. 5, 1987

[51] Int. Cl.4 .................. F16K 31/08; F16K 35/16
[52] U.S. Cl. .................. 137/296; 70/276;
 81/125; 81/176.1; 137/382; 137/384.8; 192/84
 PM; 220/85 P; 220/284; 251/65; 251/89;
 251/291; 403/1; 403/DIG. 1
[58] Field of Search .............. 70/276; 137/272, 291,
 137/296, 299, 382, 383, 384.2, 384.8, 800;
 81/125, 176.1, 176.15; 251/65, 89, 291; 192/67
 R, 84 PM, 108; 403/DIG. 1, 1; 220/85 P, 284,
 285, 286

[56] References Cited

U.S. PATENT DOCUMENTS

| | | | |
|---|---|---|---|
| 2,118,233 | 5/1938 | Ruggio | 137/296 |
| 3,453,655 | 7/1969 | Quinones et al. | 137/296 |
| 3,556,131 | 1/1971 | Diaz | 251/291 |
| 3,626,961 | 12/1971 | Quinones | 137/296 |
| 3,840,041 | 10/1974 | McMurray | 137/296 |
| 3,916,939 | 11/1975 | Gillard | 137/296 |
| 4,369,807 | 1/1983 | Camp | 137/296 |
| 4,390,038 | 6/1983 | Salvato | 137/296 |
| 4,566,481 | 1/1986 | Leopold, Jr. et al. | 137/296 |
| 4,620,428 | 11/1986 | Kopesky | 251/65 |

Primary Examiner—George L. Walton

[57] ABSTRACT

A device is provided, designed to prevent unauthorized operation of fire hydrants by completely concealing the hydrant operating nut and weather shield within freely rotating sleeves, thereby rendering the hydrant inoperable. The hydrant is made operable by the use of a specially designed self-contained magnetic operating wrench. The hydrant again becomes inoperable when the magnetic wrench is disengaged. The device is externally mounted for easy, quick field installation with common tools, and requires no modification of the internal hydrant mechanism. The device is designed to be used on all hydrant makes and models having an operating nut extending vertically above the hydrant bonnet.

9 Claims, 10 Drawing Figures

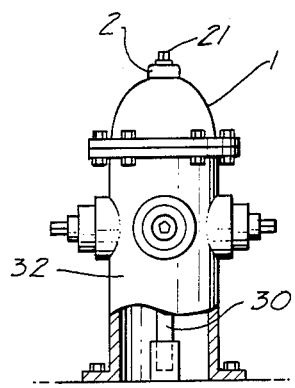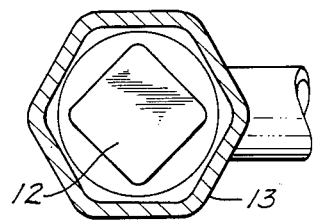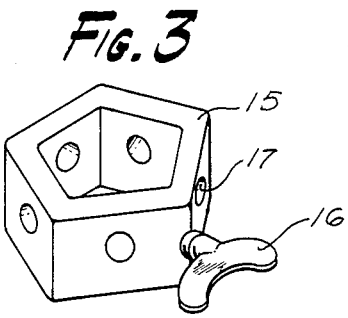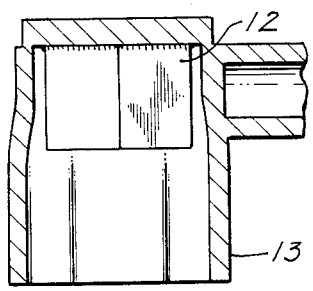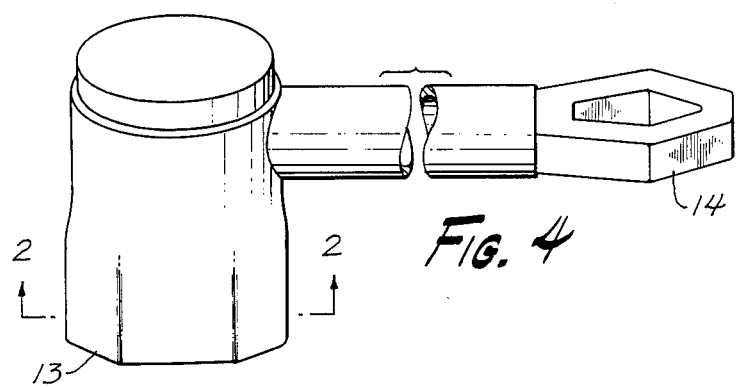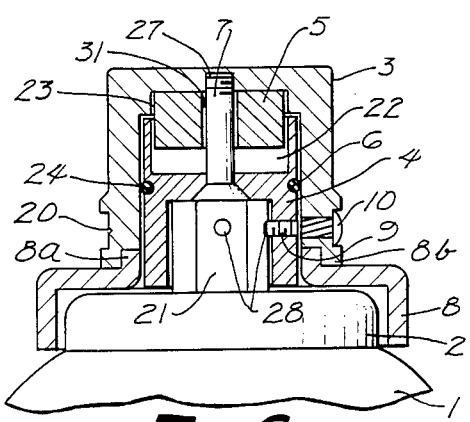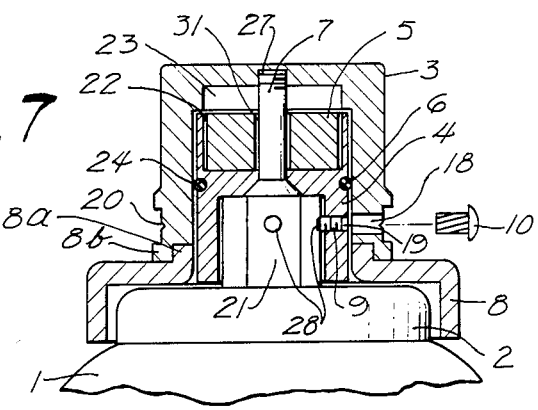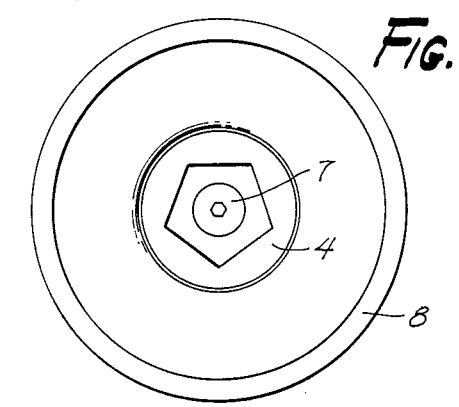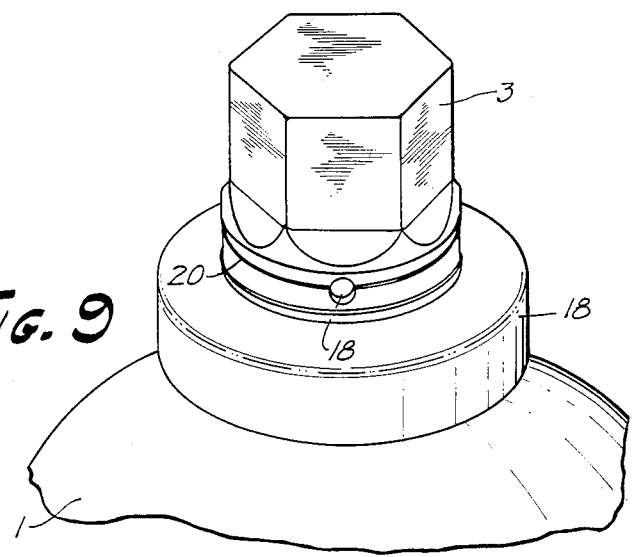

MAGNETIC FIRE HYDRANT GUARD

INVENTION BACKGROUND (1) Field of the Invention

The present invention generally appertains to improvements in fire hydrants, and more particularly relates to a new and novel guard arrangement for prevention of unauthorized turning of the hydrant operating stem and, in the instance of hydrants equipped with weather shields, to prevent said weather shields from being rotated or tampered with by unauthorized persons.

(2) State of the Art

The problem of unauthorized operation of fire hydrants is becoming more and more serious, particularly in larger cities. Problems caused by fire hydrant vandalism are loss of valuable treated water, street damage and street icing in winter, fire hydrants found to be inoperative when most needed, loss of water/pressure required to effectively fight a fire, and flooding of public and private property. To be totally acceptable to water and fire departments, a fire hydrant protective device must meet the following requirements:

A. The device must not prevent or delay authorized operation of the protected hydrant at any time.
B. The device must be adaptable to all hydrant makes and models commonly in use because a fire protection system can be completely effective only when all hydrants in the system are protected.
C. The device must provide protection for the hydrant weather shields on hydrants built with the weather shield feature.
D. The protective device must be designed for quick, inexpensive field installation and removal without damage to, or alteration of, the internal mechanism of the hydrant.
E. The device must be capable of withstanding a high degree of abuse.
F. The device must be designed to prevent removal by unauthorized persons but allow for quick, easy removal by those authorized to make such removal for hydrant maintenance.
G. The device must be available at a reasonable price.

Many attempts have been made to develop a device to protect against unauthorized operation and vandalism of fire hydrants by means of shielding the hydrant operating nut projecting above the hydrant bonnet, or by altering the internal mechanism of the hydrant. None provide protection of the hydrant weather shield, which can also be used to operate the hydrant.

For example, in U.S. Pat. Nos. 3,840,041 and 3,916,939, magnetic type arrangements of rather complicated design have been disclosed. Such devices require major internal modification of the hydrant, which can only be efficiently accomplished in a well equipped shop. They do not lend themselves to field installation. Since most of the hydrants to be protected are located in the field, moving them to the shop and back to the field again increases the cost of installation dramatically, and takes hydrants out of service for an unacceptable length of time. Also, since the hydrant internal mechanism is altered when the device is originally installed, expensive new internal parts must be purchased to put the hydrant back into operation in case the protective device is abandoned.

U.S. Pat. No. 2,118,233 reveals a patent wherein a protective collar encircles the hydrant operating nut with the collar being affixed to the hydrant bonnet by means of legs attached to the bonnet fixing bolts designed to hold the bonnet to the hydrant barrel. The attached legs are inadequate to hold the collar in place because the fixing bolts can easily be removed using common tools, permitting the complete removal of the device from the hydrant bonnet. Also, this device will not fit all makes of hydrants commonly in use.

In U.S. Pat. No. 4,390,038 a device is shown wherein a portion of the upper end of the hydrant operating stem, including the operating nut, is completely removed to make room for internal installation of a device which functions in response to a specially designed magnetic tool, which must be used in conjunction with a conventional hydrant operating wrench. The need for the fire fighter to use two tools simultaneously to operate the hydrant makes quick operation difficult and cumbersome. Installation of the device in the field would be next to impossible considering the major internal hydrant modifications required. Removal of the device leaves the hydrant without a functional operating stem which would need to be replaced at considerable expense if the hydrant is to be returned to its original operating condition. The device is designed to fit only one make of hydrant, leaving other hydrants in a fire fighting system unsecured.

In U.S. Pat. No. 3,453,655 a device is shown wherein a collar is built around the hydrant operating nut in such a manner that the operating nut can be engaged and turned by means of an ordinary 12-point deep socket wrench. The device involves a rather complicated modification of the internal hydrant mechanism to permit installation of a positive locking device. Field installation would be impractical making the system extremely expensive. Installation and/or removal of the device would take the hydrant out of service for an unacceptable length of time. Hydrants with weather shields cannot be protected by this device.

U.S. Pat. No. 4,369,807 is shown wherein a collar encircles the hydrant operating nut, said collar having an outward flange around the base where it meets the hydrant bonnet. An adapter designed with an inward flange is placed over the collar and lowered to contact the bonnet and interlock with the outward flange of the collar, said adapter then being welded to the hydrant bonnet leaving the collar free to rotate within the adapter. The device is simple and inexpensive, but there are weaknesses as well. The device cannot be easily removed for hydrant maintenance, and a skilled welder is required to do the installation.

U.S. Pat. No. 3,556,131 is shown wherein there is an externally mounted protective device providing limited access to the hydrant operating nut, the exposed portion of which is subject to engagement and operation by means of some common tools such as a chain wrench. Approximately half of the hydrants now in use are built with the weather shield feature. This device will not prevent operation of weather shield hydrants by means of a pipe wrench, or stilson wrench, applied to the exposed weather shield portion of the hydrant operating nut.

The device presently being offered for patent provides for quick, simple field installation and removal, without welding and without any mechanical alteration of the hydrant; complete protection of the hydrant operating nut and weather shield; it fits virtually all hydrants now in common use; and leaves the hydrant in its original working condition if the device is removed.

None of the foregoing patented devices meet all the requirements set out in (2) State of the Art. The device presently being offered for patent meets all of the requirements referred to in the above-mentioned paragraph.

SUMMARY OF THE INVENTION

The primary object of the present invention is to overcome the deficiencies existing in the known fire hydrant protective devices by providing an externally mounted, structurally sound, and uncomplicated arrangement for protecting the operating nut of a fire hydrant against unauthorized engagement, and also for protecting the hydrant weather shield which is part of, and which turns with the hydrant operating nut, thus providing complete and constant protection for virtually all hydrants against unauthorized operation.

An equally important object of the present invention is to provide a guard arrangement which can be quickly and easily installed on any type of fire hydrant equipped with an operating nut extending vertically above the hydrant bonnet, regardless of the configuration of the bonnet or operating stem thereof, and which is so fixedly attached to the hydrant operating nut that it cannot be removed by anyone unfamiliar with the method of installation, and which so protects the operating nut that a specially designed, self-contained, magnetic operating wrench is required to engage and turn the hydrant operating nut.

The present invention is in the form of an arrangement that completely encases the nut end, whereby no conventional wrench can be used to engage the nut and turn the hydrant operating stem.

In particular, the hydrant operating nut is completely within a mating recess in the bottom of a cylindrically shaped core piece, and held fixedly in place over the operating nut by set screws passing through the sides of said core piece and being countersunk into the vertical, flat sides of the operating nut. A square locking block rests loosely within a square recess in the flat top of said core piece, said square locking block being restricted against horizontal turning action by the sides of the square recess in which it rests. The core piece and locking block are enclosed within a sleeve which surrounds and covers said core piece and locking block loosely enough to allow free rotation of said sleeve around said core piece. The outside flat top of the sleeve is formed to mate with a magnetic wrench. A square recess is built into the center of the underside of the top of said sleeve, said recess being the same size and shape as the recess in the top of the core piece, but only half as deep as the recess in the core piece.

The core piece, locking block, and sleeve are assembled into a single unit by an assembly bolt which passes upwardly through the center of said core piece and locking block, and threaded into a hole in the center of the underside of the top of said sleeve. The hole in the center of said locking block is slightly oversize to allow free vertical movement of the locking block up and down the assembly bolt. An "O" ring set in a groove around the core piece seals the space between the core piece and the sleeve, preventing air, moisture, and dust circulation into the recess holding the locking block, which could interfere with the free movement of the locking block in response to the magnetic attraction of the operating wrench.

When the magnetic operating wrench is mated with the formed top of the sleeve, the steel locking block is drawn up into the recess in the underside of the top of the sleeve, leaving half its length inside the recess in the core piece. In this position the core piece and the sleeve are joined by the locking block and turn together when rotated by the magnetic operating wrench which, in turn, opens or closes the hydrant flow valve located at the base of the hydrant. When the magnetic wrench is disengaged, the locking block gravitationally falls back into the core piece, thereby leaving the hydrant inoperable until the magnetic wrench is reapplied.

A fire hydrant weather shield, used on many hydrants, is an enlarged portion of the base of the operating nut. To completely protect a weather shield type hydrant it is necessary to protect the weather shield portion of the operating nut as well as the top portion which is designed to be engaged by a conventional operating wrench. Weather shield hydrants are protected by means of a flanged cover, shaped to protectively and loosely encase the weather shield in a manner which precludes contact with the weather shield by any type of tool, said weather shield cover being held in place by means of a vertical flange around the top of the weather shield cover which interlocks with a downward flange built into the inside base of said sleeve, said interlocking flanges fitting loosely enough to allow free rotation of the weather sheild cover around the weather shield.

The core piece and the sleeve of the present invention are fabricated of T6 aluminum, a high strength aluminum alloy commonly used in the manufacture of automobile wheels and engine blocks. This material will not shatter under heavy abuse nor will it rust, corrode, or react to magnetic force. The locking block is made of tool steel which is highly responsive to magentic attraction. The weather shield cover is fabricated of ductile iron, a tough, shatterproof alloy or T6 Aluminum.

Installation on, or removal from hydrants located in the field or in the shop can be accomplished quickly and easily by a common laborer using tools with which he is familiar. Removal of the device is equally time efficient and leaves the hydrant in its unprotected condition ready for immediate service without further expense for parts or labor.

BRIEF DESCRIPTION OF THE DRAWINGS

FIG. 1 is an elevational view of a conventional fire hydrant.

FIG. 2 is an end elevational view of a magnetic wrench.

FIG. 3 is a prospective view of a jig.

FIG. 4 is a sectional view of a magnetic wrench indicating the position of the magnet.

FIG. 5 is a side elevational view of a magnetic wrench on one end of the handle and a conventional wrench on the other end.

FIG. 6 is a sectional view of the protective device mounted on a fire hydrant, with the locking block in the engaged position, and with the weather shield cover in place over the weather shield.

FIG. 7 is the same view as FIG. 6, but showing the locking block in the disengaged position.

FIG. 8 is an end elevational view of the weather shield cover coupled with the core piece and sleeve, taken on 5—5 FIG. 6.

FIG. 9 is a side elevational view of the weather shield cover and the assembled protective device, mounted on a hydrant.

A DESCRIPTION OF THE PREFERRED EMBODIMENTS

Figure 10:
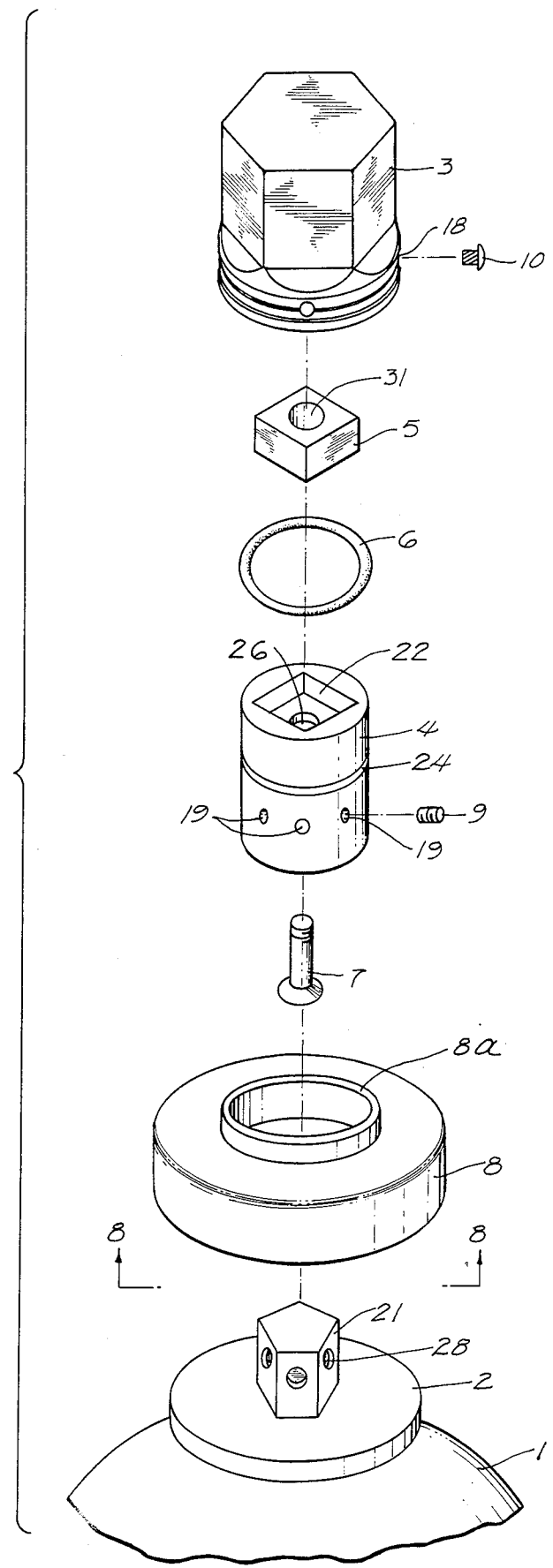
FIG. 10 is an exploded prospective view of a modified form of the protective device, for use with a hydrant built with a weather shield.

For the purpose of promoting an understanding of the principles of the invention, reference will be made to the embodiment illustrated in the drawings, and specific language will be used to describe the same. It will, nevertheless, be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a conventional fire hydrant is shown including a stand pipe, or barrel 32, having an upper end on which a bonnet 1 is bolted, and an operating stem 30 extending vertically inside the barrel, the upper end of which extends through bonnet 1 and terminates in an operating nut 21, and the lower end of which is coupled to the hydrant flow control valve located underground at the base of the hydrant. Rotation of operating nut 21 turns operating stem 30 which, in turn, opens or closes the flow control valve. Some hydrants are built with a weather shield 2, which is an enlarged portion of the base of the nut end, and which is a part of, and turns with, the hydrant operating nut. To adequately protect weather shield hydrants, it is essential that both operating nut 21, and weather shield 2, be protected from unauthorized operation.

Using exploded view FIG. 10 as a point of reference, assembly of the various parts of the device into a single functional unit is accomplished by sliding "O" ring 6 into groove 24 which is cut around the outside circumference of core piece 4. Set screws 9 are threaded into set screw holes 19, assembly bolt 7 is inserted upwardly through hole 26 in core piece 4, through hole 31 in the center of steel locking block 5 which rests loosely in recess 22 on top of core piece 4, and threaded into hole 27 FIGS. 6 and 7, located in the center of the underside of sleeve 3, hole 31 in the center of locking block 5 being slightly oversize to allow locking block to slide freely up and down assembly bolt 7.

The inside diameter of sleeve 3 is slightly larger than the outside diameter of core piece 4, thereby allowing sleeve 3 to rotate freely around core piece 4. "O" ring 6 seals off air circulation into the upper portion of core piece 4, thereby reducing the possibility of intrusion of air, moisture, dust and other matter into the area where the locking block is situated, which might interfere with the free action of locking block 5 up and down assembly bolt 7.

Precise location of shallow holes 28 tapped into the vertical flat faces of the sides of operating nut 21, FIGS. 6 and 7, is accomplished by means of tapping jig 15, FIG. 3, when said jig is placed over and around operating nut 21 and lowered to the base of said nut 21, where it is held securely in place by tightening wing nut 16, FIG. 3. Very shallow holes 28, FIGS. 6 and 7, are drilled into the vertical sides of nut 21 to provide secure seating for set screws 9, using guide holes 17 in jig 15, FIG. 3 to assure proper vertical alignment between set screws 9 and recesses 28, FIGS. 6 and 7, after which jig is removed from nut 21.

For hydrants with weather shields, weather shield cover 8, FIGS. 8 and 10, is placed over and around operating nut 21, and lowered over weather shield 2, FIGS. 6 and 7. The assembled core piece 4, locking block 5, and sleeve 3 is lowered over operating nut 21 with upward flange 8a, FIG. 10, of weather shield cover 8 mating inside downward flange 8b, located at the bottom of sleeve 3, FIGS. 6 and 7, said weather shield cover 8 being free to rotate within downward flange 8b of sleeve 3. Weather shield cover 8 is not required to protect hydrants built without the weather shield feature. Rotation of sleeve 3 around core piece 4 provides horizontal alignment of access hole 18, FIGS. 7 and 10, with set screws 9, FIGS. 6 and 7. An allen wrench inserted through the access hole 18, FIGS. 7 and 10, is used to tighten set screws 9 securely into the shallow holes 28 tapped into the sides of operating nut 21. With all set screws securely tightened, a self threading drive screw 10, FIGS. 6 and 7, is driven into access hole 18, the round head of said drive screw being countersunk into sleeve 3 as shown in FIG. 6, making it very difficult to remove. When it is necessary to remove the device for hydrant maintenance, a new access hole is drilled through sleeve 3, said access hole being centered anywhere in groove 20, FIG. 7, cut around sleeve 3 which assures proper vertical alignment of said access hole with set screws in core piece 4. An allen wrench inserted through the new access hole is used to loosen set screws 9 from nut 21 for removal of the protective device from the hydrant. After hydrant repairs are completed, the protective device is again placed over said operating nut 21, the set screws tightened, and a new drive screw is driven into the new access hole.

FIGS. 2, 4, and 5 show the hydrant operating tool which is composed of a magnetic socket type wrench 13 on one end, and a conventional box wrench 14 on the other end. When magnetic wrench 13 is in the engaged position, mated with sleeve 3, magnet 12, FIGS. 2 and 5, contacts sleeve 3. Magentic force from said magnet passes through aluminum sleeve 3, drawing steel locking block 5 up into recess 23 in the underside of the top of said sleeve a distance of half the thickness of said locking block, as illustrated in FIG. 6, leaving the remaining half within recess 22 in the top of core piece 4. With the said square locking block in this position, said locking block is not rotatable within the confines of the square recesses in which it lies without imparting a similar rotational action to sleeve 3, core piece 4, operating nut 21, and operating stem 30, which opens or closes the hydrant flow control valve. Disengagement of the magnetic wrench allows said locking block to gravitationally drop back into its original position within recess 22 in core piece 4, thereby allowing sleeve 3 to again turn independently around core piece 4, rendering the hydrant inoperable until the magnetic wrench is again engaged to sleeve 3.

With the protective device securely in place, both the hydrant operating nut 21, and the weather shield 2, are well protected against unauthorized operation or vandalism, and yet the hydrant is readily available for immediate service.

It is believed that from the foregoing description, taken in conjunction with the attached drawings, the purpose, structural arrangement, and operation of the fire hydrant protective device will be quite clear. It is understood that such descriptions and showings are merely exemplary of the invention which is only limited by the spirit and scope of the appended claims.

What is claimed is:

1. In combination with a fire hydrant having a stand pipe on which a bonnet is mounted, and having a valve operating stem extending rotatably through the bonnet and terminating in a nut end above the bonnet, a protective device for the nut end comprising a cylindrically shaped core piece completely encasing the operating nut end and directly and engagably supported by the nut end, and fixedly secured to the nut end by means of set screws threaded through the core piece and seated into shallow holes drilled into the vertical, flat faces of the nut end, and with a square recess built into the center of the flat top of the core piece wherein loosely rests a square steel locking block of a length equal to the depth of the recess in which it rests, said core piece and locking block being surrounded and covered by a sleeve having an inside diameter slightly larger than the outside diameter of the core piece, thereby allowing the sleeve to rotate freely around the core piece; an square recess is built into the center of the underside of the top of the sleeve, said recess having the same outside dimensions as the recess built into the top of the core piece, but only half as deep as the recess in the top of the core piece; an assembly bolt being engagably and directly supported by the top portion of the nut end, said bolt assembly passes upwardly through a first opening in the center of the core piece and through a second opening in the locking block, and is threadedly secured to the center of the underside of the top of the sleeve, thus assembling the parts of the device into a single unit, and wherein the set screws are secured to the nut end by means of an allen wrench inserted through an access hole in the sleeve after which the access hole is closed by driving a self-threading drive screw into the access hole, thus permanently plugging the access hole preventing further access to the set screws;

said protective device requires a new access hole to be drilled through the wall of the sleeve at any point centered in a pre-groove cut around the circumference of the sleeve through which an allen wrench can again be inserted to loosen the set screws from the nut end, allowing easy removal of the protective device from the hydrant and preventing unauthorized use of the fire hydrant;

a self-contained magnetic operating wrench for rotating the hydrant operating stem, the locking block lies completely within the recess in the top of the core piece leaving the sleeve free to rotate around the core piece without turning the hydrant operating stem prior to the mating of the operating wrench with the sleeve, when the self contained magnetic wrench is mated with the formed top of the sleeve, magnetic attraction draws the locking block up into the square recess in the underside of the top of the sleeve slidably along the assembly bolt, a distance of half its length, leaving the remaining half of the locking block within the recess in the top of the core piece, wherein any turning action of the magnetic operating wrench imparts a similar turning action to the sleeve, locking block, core piece, nut end and operating stem which activates the flow control valve upon removal of the magnetic wrench the locking block will gravitationally drop back into its original position within the recess in the top of the core piece slidably along the assembly bolt, thereby leaving the hydrant inoperable until the magnetic wrench is reapplied.

2. The invention of claim 1, wherein said nut end being inaccessible to any conventional type of operating tool.

3. The invention of claim 1, wherein rotational movement of said square locking block is restricted by the square recesses in which it is confined.

4. The invention of claim 1, wherein said assembly bolt being supported by the nut end and located completely within said device when it is secured to the hydrant operating nut, thereby eliminating the possibility of unauthorized tampering with said assembly bolt.

5. The invention of claim 1, wherein access to set screws used to secure the device to the hydrant operating nut, is provided by an access hole drilled through the sleeve, said access hole being permanently blocked against further use by means of a self-threading drive screw being driven into said access hole after said set screws have been securely tightened, thereby preventing further access to said set screws.

6. The invention of claim 1, wherein provision is made for protection of weather shield type hydrants from unauthorized operation by means of a rotatable weather shield cover held in place over and around said weather shield by means of interlocking flanges, thereby rendering said weather shield inaccessible to any type of operating tool.

7. The invention of claim 1, wherein a magnetically operated fire hydrant protective device is designed to fit any known make or model fire hydrant equipped with a vertically mounted operating nut.

8. The invention of claim 1, wherein a magnetically driven fire hydrant protective device is designed for quick, external field installation and removal, without modification of the internal hydrant mechanism.

9. The invention of claim 1, wherein the protective device is designed for external installation without modification of hydrant internal mechanism, and wherein said fire hydrant is immediately ready for service when said device is removed from said hydrant.

* * * * *